(12) United States Patent
Chang et al.

(10) Patent No.: US 6,768,993 B2
(45) Date of Patent: Jul. 27, 2004

(54) SYSTEM AND METHOD FOR FILE SYSTEM COOPERATION IN A MULTI-THREADED ENVIRONMENT

(75) Inventors: Joon Chang, Austin, TX (US); Amy Yi-mei Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 09/893,427

(22) Filed: Jun. 28, 2001

(65) Prior Publication Data

US 2003/0004918 A1 Jan. 2, 2003

(51) Int. Cl.[7] .................................................. G06F 7/00
(52) U.S. Cl. ........................................ 707/8; 707/201
(58) Field of Search .............................. 707/1, 8, 200, 707/201, 205, 206

(56) References Cited

U.S. PATENT DOCUMENTS

| | | | | |
|---|---|---|---|---|
| 4,439,830 | A | | 3/1984 | Chueh ........................ 364/200 |
| 5,175,852 | A | | 12/1992 | Johnson et al. ............. 395/600 |
| 5,202,971 | A | | 4/1993 | Henson et al. .............. 395/425 |
| 5,218,696 | A | * | 6/1993 | Baird et al. ..................... 707/1 |
| 5,412,808 | A | * | 5/1995 | Bauer .............................. 707/1 |
| 5,828,876 | A | | 10/1998 | Fish et al. ................... 395/601 |
| 5,931,919 | A | | 8/1999 | Thomas et al. ............. 709/303 |
| 5,940,841 | A | | 8/1999 | Schmuck et al. ........... 707/205 |
| 5,950,199 | A | * | 9/1999 | Schmuck et al. ............. 707/8 |
| 5,960,446 | A | * | 9/1999 | Schmuck et al. ........... 707/205 |
| 5,987,477 | A | * | 11/1999 | Schmuck et al. ........... 707/201 |
| 5,999,976 | A | * | 12/1999 | Schmuck et al. ........... 709/226 |
| 6,021,414 | A | * | 2/2000 | Fuller ......................... 707/202 |
| 6,032,216 | A | * | 2/2000 | Schmuck et al. ........... 710/200 |
| 6,377,958 | B1 | * | 4/2002 | Orcutt ........................ 707/200 |
| 6,493,804 | B1 | * | 12/2002 | Soltis et al. ................ 711/152 |
| 6,665,675 | B1 | * | 12/2003 | Mitaru ........................ 707/10 |
| 2002/0078239 | A1 | * | 6/2002 | Howard et al. ............. 709/245 |
| 2002/0112023 | A1 | * | 8/2002 | Karamanolis et al. ...... 709/217 |

OTHER PUBLICATIONS

Heidemann et al. "Performance of Cache Coherence in Stackable Filing." Proceedings of the Fifteenth ACM Symposium on Operating Systems Principles. vol. 29, No. 5, pp. 127–141, Dec. 1995. ACM Press.*
Duchesne, Regis, *NTFS Documentation* (Internet).
Gruenbacher, Andreas, Proposal for Extended Attributes for Posix security extensions, LWN.net (Internet, Oct. 22, 2000).
U.S. patent application Ser. No. 09/656,520, Chang et al., filed Sep. 7, 2000.
U.S. patent application Ser. No. 09/801,605, Chang et al., Mar. 8, 2000.

\* cited by examiner

*Primary Examiner*—Safet Metjahic
*Assistant Examiner*—Brian Goddard
(74) *Attorney, Agent, or Firm*—Joseph T. Van Leeuwen; Diana L. Roberts

(57) ABSTRACT

A file system maintains information about files in data areas called dinodes. Dinodes are grouped into dinode pages wherein each dinode page includes information about one or more dinodes. Each dinode may use extended attribute data. Each dinode page having at least one dinode that uses extended attribute data has a corresponding dinodex page. The dinodex page includes extended attribute information about any of the dinodes in the dinode page that use extended attribute information. The page is divided into areas, each area corresponding to a different dinode. A lock is established for each dinode page so that any dinode adding or deleting its extended attribute address obtains the lock before proceeding to maintain cooperation between the dinodes. In this manner multiple extended attribute areas are prevented from corresponding with a particular dinode page and unused extended attribute pages are removed without unduly impacting system performance.

17 Claims, 12 Drawing Sheets

SYSTEM AND METHOD FOR FILE SYSTEM COOPERATION IN A MULTI-THREADED ENVIRONMENT

BACKGROUND OF THE INVENTION

1. Technical Field

The present invention relates to managing extended file attributes. More particularly, the present invention relates to a system and method for locking file system pages when using file system extended attributes.

2. Description of the Related Art

Operating systems, such as the UNIX operating system, use a file system for managing files. UNIX uses a hierarchical directory structure for organizing and maintaining files. Access permissions correspond to files and directories. The UNIX operating system organizes files into directories which are stored in a hierarchical tree-type configuration. At the top of the tree is the root directory which is represented by a slash (/} character. The root directory contains one or more directories. These directories, in turn, may contain further directories containing user files and other system files.

The fundamental structure that the UNIX operating system uses to store information is the file. A file is a sequence of bytes. UNIX keeps track of files internally by assigning each file a unique identification number. These numbers, called I-node numbers, are used only within the UNIX kernel itself. While UNIX uses i-node numbers to refer to files, it allows users to identify each file by a user-assigned name. A file name can be any sequence of characters and can be up to fourteen characters long.

There are three types of files in the UNIX file system: (1) ordinary files, which may be executable programs, text, or other types of data used as input or produced as output from some operation; (2) directory files, which contain lists of files in directories outlined above; and (3) special files, which provide a standard method of accessing input/output devices.

Internally, a directory is a file that contains the names of ordinary files and other directories and the corresponding i-node numbers for the files. With the i-node number, UNIX can examine other internal tables to determine where the file is stored and make it accessible to the user. UNIX directories themselves have names, examples of which were provided above, and can be up to fourteen characters long.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk drives and disk arrays. UNIX organizes a disk into a sequence of blocks. These blocks are usually either 512 or 2048 bytes long. The contents of a file are stored in one or more blocks which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Addresses 12 and 13 are used for second level and third level indirect blocks, respectively, with the indirect addressing chain before the first data block growing by one level as each new address slot in the direct i-node is required.

In addition to the standard information maintained by the file system for a particular file, metadata, or extended attributes, about the file are often needed by an application that uses the file. Because extended attributes vary greatly, depending on the type of application and the type of metadata to be maintained, this information is typically stored outside the standard i-node attribute data area. For example, a word processing application may need to store information regarding the document, such as profile information entered by a user. While this information is not stored with the document file, it needs to be in a related storage area for efficient processing by the application. Traditionally, extended attributes are stored in specific fields that are allocated for the attributes. The fields may store the actual extended attribute data or may store a pointer to another storage area containing attribute data that will not fit in the allocated space.

One challenge found in traditional systems is that a fixed allocated space for the extended data limits the amount of data that can be stored. When more extended data is needed, a pointer is stored in the allocated space which points to a separate data stream. Updating data stored in a separate data stream is inefficient because the separate extended attribute data stream is reconstructed in response to a change in the size of the attribute data. A further challenge exists in retrieving summary information regarding the extended attributes. Summary information is gathered by analyzing each substring within the extended attribute data stream causing further file processing inefficiencies.

What is needed, therefore, is a way of efficiently adding, modifying, or deleting extended attribute data without needing to reconstruct complex data streams each time the extended attribute size is modified. Placing extended attribute data in extended attribute pages that correspond to dinode attribute pages, however, creates additional challenges.

Files with information stored in a particular dinode page need not have any relationship or similarities other than being maintained within a common dinode page by the file system. Because the dinode page corresponds to a particular extended attribute page it is possible for two dinodes in the same dinode page to each create a dinodex (extended attribute) page at virtually the same time. In addition, if two dinodes attempt to delete their extended attributes at virtually the same time it is possible that neither dinode will realize that the dinodex page is empty and should be released. Other permutations are also possible that create additional challenges when unrelated dinodes share a common dinode page and a common dinodex page.

What is needed, therefore, is a concurrency control algorithm to ensure cooperation between dinodes in using common extended attribute pages in a multi-process, multi-threaded environment.

SUMMARY

It has been discovered that an additional field lock applied to the extended attribute address field maintained in a dinode page provides two level cooperation between dinodes. In a dinode data area, one field is used to store extended attribute summary information. This extended attribute summary information includes an address of a dinodex page that corresponds to the dinode. If the dinode does not have extended attribute data its extended attribute page address is zero. On the other hand, if the dinode has extended attribute data, its address is the address of the dinodex page. Each dinode within the same dinode page that uses extended attribute data will have the same dinodex page address because one dinodex page corresponds with the dinode page.

A new page lock (called an "EA Lock") is implemented for each dinode page. Insertion, deletion, or update of the extended attribute data requires the dinode to acquire the EA Lock before the operation is performed. The EA Lock does not effect other dinode page operations, such as reading and writing dinodes in the same dinode page for fields other than the EA address field. Limiting the operations that involve the EA Lock provides for a small lock granularity so that few activities are blocked by the lock and system throughput is adequately maintained.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
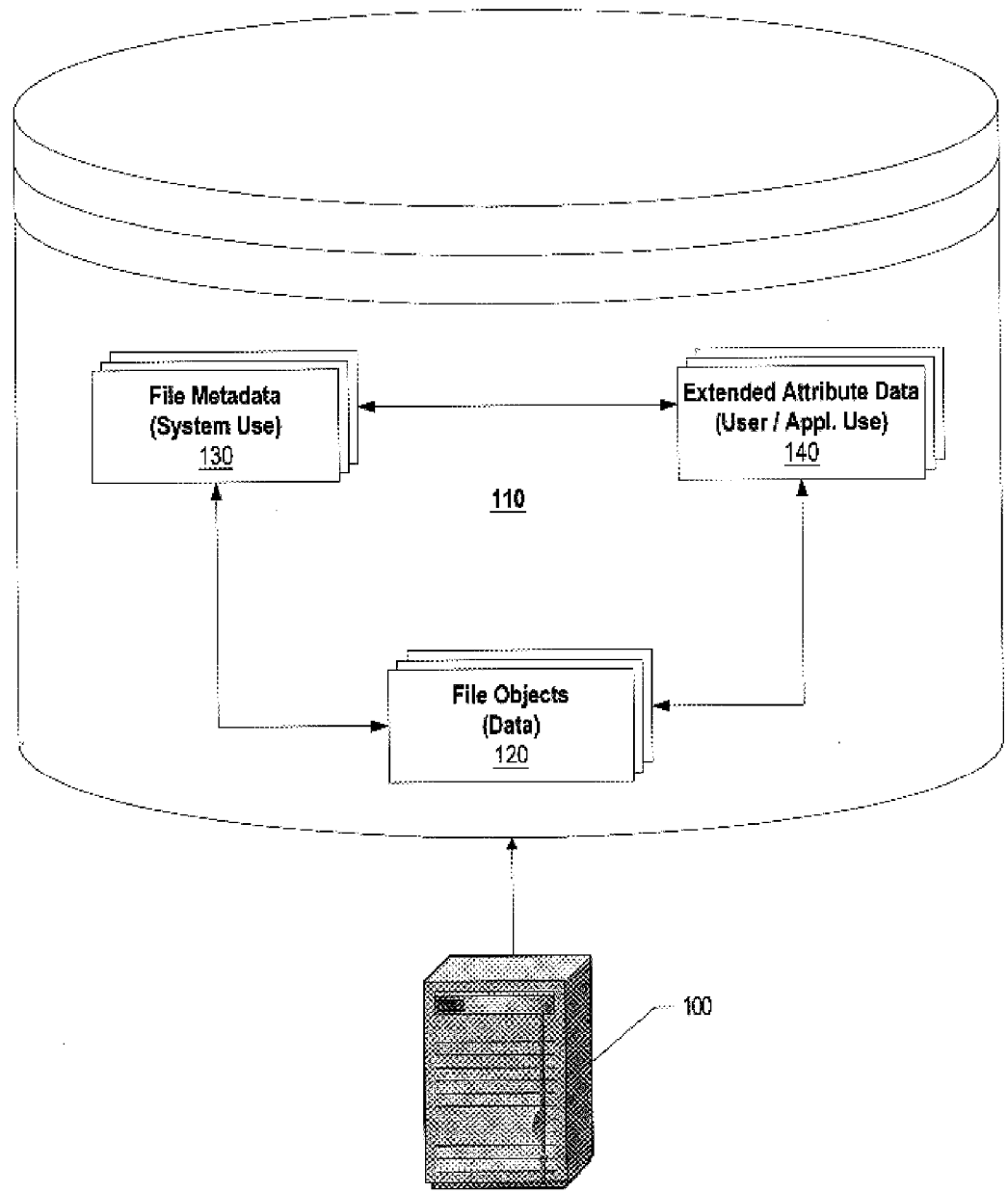
FIG. 1 is a high level diagram of a computer with a file system that includes extended attribute data.

FIG. 1 shows a high level diagram of a computer with a file system that includes extended attribute data. Computer system 100 includes an operating system for controlling the operation of the system. Part of the operating system includes a file system for managing nonvolatile storage, such as a disk drive, accessible by computer system 100. Nonvolatile storage device 110 is managed by the file system operating within computer system 100. The file system manages various components, or objects, relating to files stored on nonvolatile storage device 110. File objects 120 include data stored in files. For example, in a word processing application file objects 120 would store the data entered by the user, such as a report, article, or the like. File metadata 130 is maintained by the file system and includes system data regarding file objects 120. System maintained data included in file metadata 130 includes such things as the date and time file objects were last used, when they were created, the size of the file objects, security information pertaining to the file objects, and name and location of the file objects within nonvolatile storage device 110.

Extended attribute data 140 includes metadata pertaining to file objects that is maintained by the file system on behalf of the user or application program. Extended attribute data 140 includes application or user specific information pertaining to file objects 120. In the word processing example, extended attribute data 120 may include the title, author, manager, a read or write password, and other items that may pertain to a word processing file. Because of their application-specific nature, it is difficult to predict what fields and data will be included in extended attribute data for a particular file. For this reason, the extended attribute handler disclosed herein provides flexibility and efficiency when dealing with extended attributes.

Figure 2:
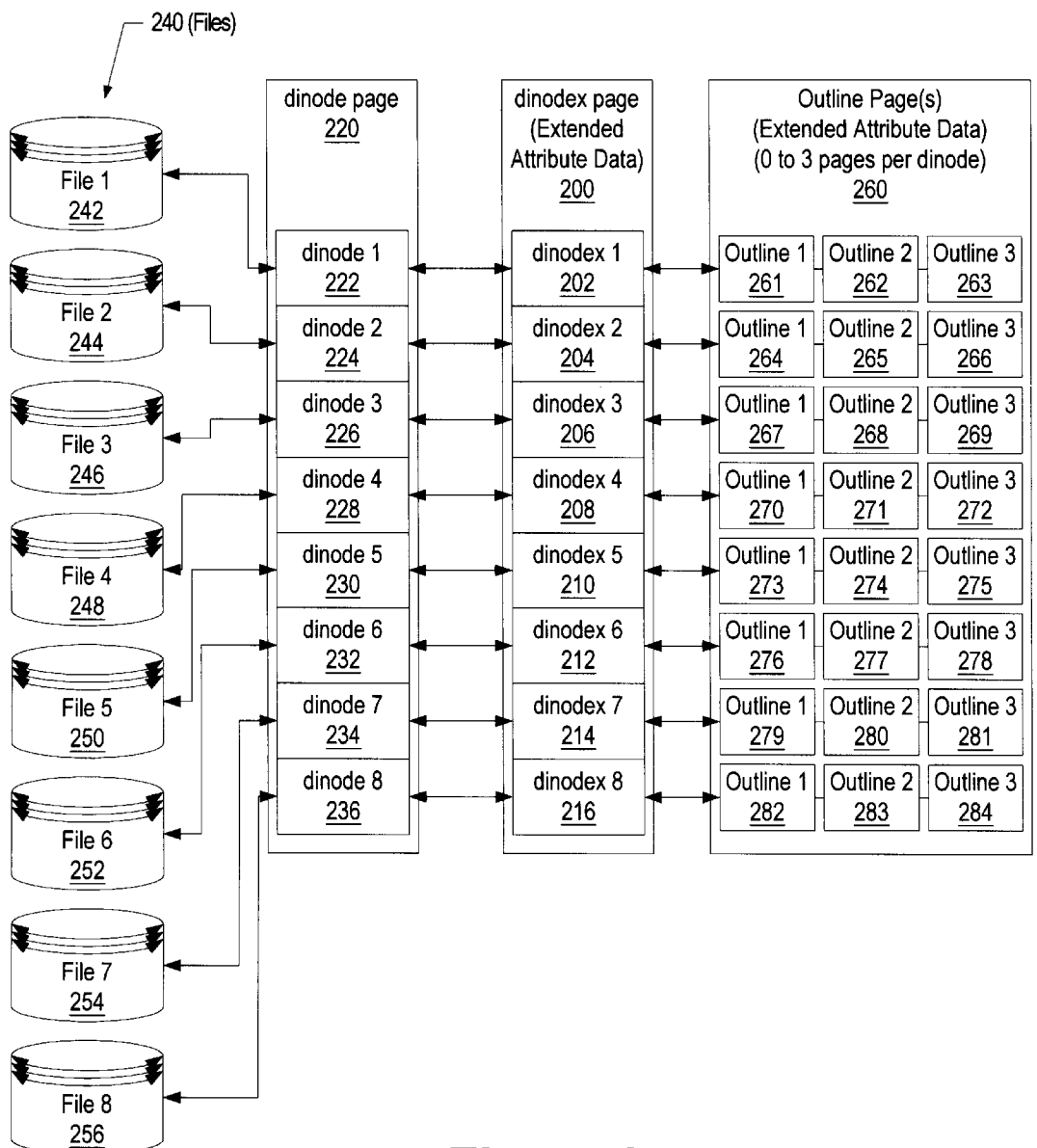
FIG. 2 is a block diagram of components included in providing extended attribute data.

FIG. 2 shows a block diagram of components included in providing extended attribute data. Extended attribute data is stored in dinodex page 200. Dinodex page 200 includes information relating to eight different files: dinodex 1 (202), dinodex 2 (204), dinodex 3 (206), dinodex 4 (208), dinodex 5 (210), dinodex 6 (212), dinodex 7 (214), and dinodex 8 (216). Each dinodex corresponds to a dinode from dinode page 220 and to 0 to 3 outline pages 260.

System metadata is stored in dinode page 220. Dinode page 220 includes information relating to eight files, each of the eight information areas corresponding with one of the dinodex data areas. File area 240 includes eight data files, each of which corresponds with a dinode and a dinodex data area. System data corresponding to file 1 (242) is stored in dinode 1 (222), while the corresponding extended attribute data is stored in dinodex 1 (202). If the extended attributes do not fit in the space available in dinodex 1 (202) (called the "inline" space), then additional outline pages (outline 1 (261), outline 2 (262), and outline 3 (263) are used to store extended attribute data in addition to the inline space available in dinodex 1 (202).

The following summarizes the remaining relationships between files, dinode data areas, dinodex data areas, and outline pages for the remaining seven files (files 2 through 8) shown in FIG. 2:

System data corresponding to file 2 (244) is stored in dinode 2 (224), while the corresponding extended attribute data is stored in dinodex 2 (204). If the extended attributes do not fit in the space available in dinodex 2 (204), then additional outline pages (outline 1 (264), outline 2 (265), and outline 3 (266) are used to store extended attribute data in addition to the inline space available in dinodex 2 (204).

System data corresponding to file 3 (246) is stored in dinode 3 (226), while the corresponding extended attribute data is stored in dinodex 3 (206). If the extended attributes do not fit in the space available in dinodex 3 (206), then additional outline pages (outline 1 (267), outline 2 (268), and outline 3 (269) are used to store extended attribute data in addition to the inline space available in dinodex 3 (206).

System data corresponding to file 4 (248) is stored in dinode 4 (228), while the corresponding extended attribute data is stored in dinodex 4 (208). If the extended attributes do not fit in the space available in dinodex 4 (208), then additional outline pages (outline 1 (270), outline 2 (271), and outline 3 (272) are used to store extended attribute data in addition to the inline space available in dinodex 4 (208).

System data corresponding to file 5 (250) is stored in dinode 5 (230), while the corresponding extended attribute data is stored in dinodex 5 (210). If the extended attributes do not fit in the space available in dinodex 5 (210), then additional outline pages (outline 1 (273), outline 2 (274), and outline 3 (275) are used to store extended attribute data in addition to the inline space available in dinodex 5 (210).

System data corresponding to file 6 (252) is stored in dinode 6 (232), while the corresponding extended attribute data is stored in dinodex 6 (212). If the extended attributes do not fit in the space available in dinodex 6 (212), then additional outline pages (outline 1 (276), outline 2 (277), and outline 3 (278) are used to store extended attribute data in addition to the inline space available in dinodex 6 (212).

System data corresponding to file 7 (254) is stored in dinode 7 (234), while the corresponding extended attribute data is stored in dinodex 7 (214). If the extended attributes do not fit in the space available in dinodex 7 (214), then additional outline pages (outline 1 (279), outline 2 (280), and outline 3 (281) are used to store extended attribute data in addition to the inline space available in dinodex 7 (214).

Finally, system data corresponding to file 8 (256) is stored in dinode 8 (236), while the corresponding extended attribute data is stored in dinodex 8 (216). If the extended attributes do not fit in the space available in dinodex 8 (216), then additional outline pages (outline 1 (282), outline 2 (283), and outline 3 (284) are used to store extended attribute data in addition to the inline space available in dinodex 8 (216).

Figure 3:
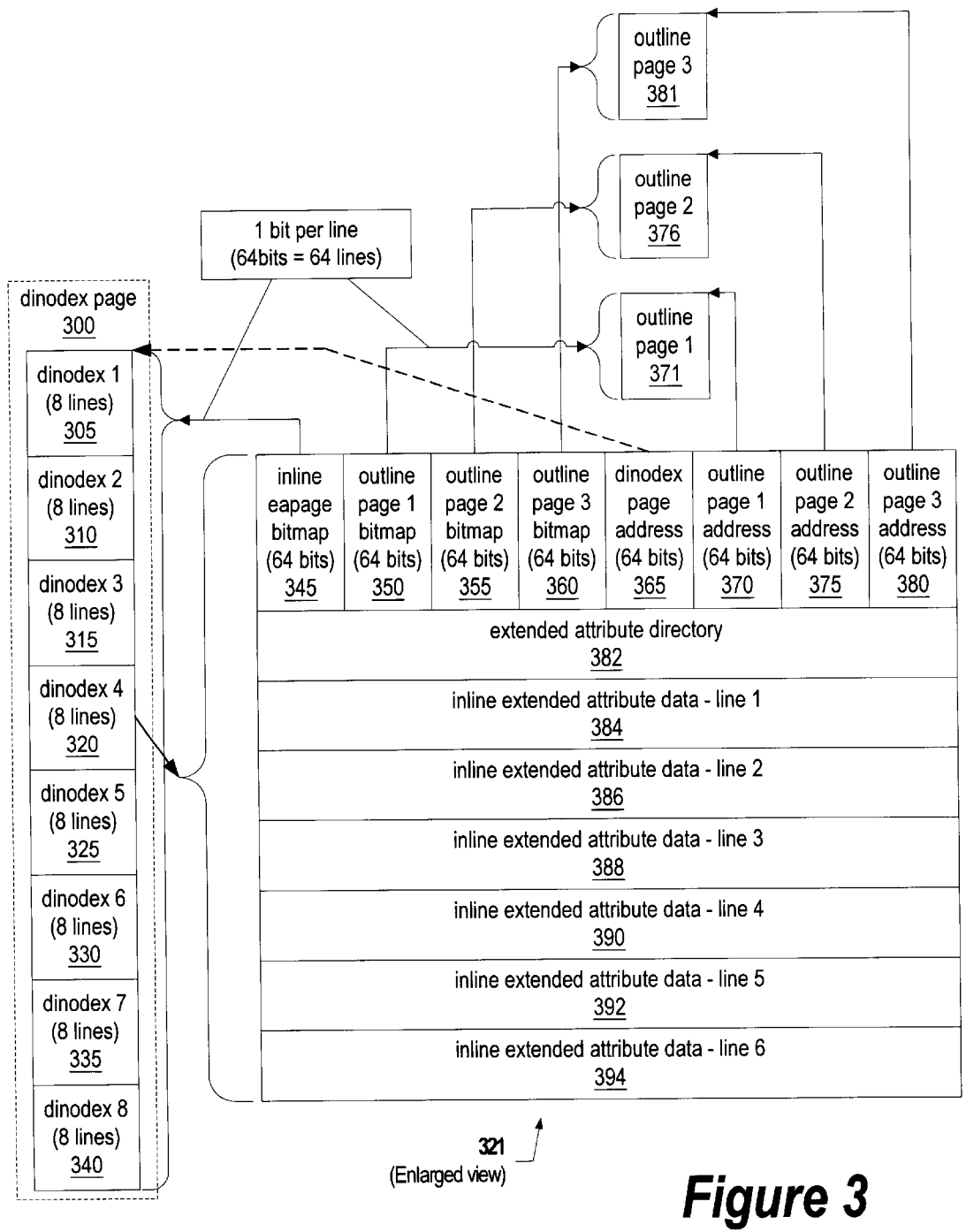
FIG. 3 is a diagram of an extended attribute page and details of data pertaining to one of the files.

FIG. 3 shows a diagram of an extended attribute page and details of data pertaining to one of the files. Dinodex page 300 is shown with eight data areas (dinodex 1 (305), dinodex 2 (310), dinodex 3 (315), dinodex 4 (320), dinodex 5 (325), dinodex 6 (330), dinodex 7 (335), and dinodex 8 (340)) corresponding to eight files. Each of the dinodex data areas is eight lines long and 512 bits (64 bytes) wide. Dinodex 4 (320) is shown enlarged (enlarged dinodex 321) to illustrate the data areas within a dinodex.

The first line of a dinodex data area is used to store various addresses and bitmaps used to manage the extended attribute space. The second line of a dinodex data area is used to store directory information pertaining to the stored extended attribute data. Extended attribute directory 382 includes information such as the extended attribute field name provided by the application storing the extended attribute data. In addition, the actual length of the data is stored along with an offset (in lines) within the extended attribute data so that the data can be retrieved by using the offset to determine the first line to retrieve and using the actual size to determine the number of 512 bit lines to retrieve.

Returning to the first line of a dinodex data area, as previously discussed, this line is used to store various addresses and bitmaps used to manage the extended attribute (dinodex) space. The first field, inline eapage bitmap 345, is 64 bits wide one bit corresponding to each line in dinodex page 300. Because there are eight lines in each dinodex area and each area is eight lines long, there are 64 bits used to represent the lines in the data area. When initializing inline eapage bitmap 345, all bits for dinodex data areas other than dinodex 4 (320) are flagged as already used. In addition, the first two lines of dinodex 4 are already in use (the first line is used to store the bitmap and addressing information, the second line used to store extended attribute directory information), so these lines are flagged as being already used as well. The remaining six lines (inline extended attribute data line 1 (384), inline extended attribute data line 2 (386), inline extended attribute data line 3 (388), inline extended attribute data line 4 (390), inline extended attribute data line 5 (392), and inline extended attribute data line 6 (394)), are available for use by the file corresponding to dinodex 4 (320), so bits corresponding to these lines are cleared to indicate that these six lines are available to store extended attribute data. When extended attribute data is stored in these lines, the corresponding bits will be flagged to indicate that the lines are already in use. Thus, the inline data area is able to store 384 bytes of data (64 bytes per line×6 lines=384 bytes).

The second, third, and fourth fields (outline page 1 bitmap 350, outline page 2 bitmap 355, and outline page 3 bitmap 360) are each used to store a bitmap for corresponding outline pages (outline page 1 371, outline page 2 372, and outline page 3 373). Each outline page contains 64 lines and each line can store 512 bits (64 bytes) of data. Therefore, each outline page is able to store 4,096 bytes (4K) of data. When a line in an outline page is used to store data, the corresponding bit in the corresponding bitmap is flagged to indicate that the line is being used.

The remaining four fields each contain a 64 bit address. The first field, dinodex page address 365, is used to store the address for the dinodex page to which this dinodex data area belongs. The second, third, and fourth fields (outline page 1 address 370, outline page 2 address 375, and outline page 3 address 380) are each used to store an address to the corresponding outline page (outline page 1 371, outline page 2 372, and outline page 3 373).

The bitmaps stored in the dinodex data area are used to determine exactly where extended attribute space is available for a given file. If space is available within the dinodex data area it is stored in the dinodex data area ("inline"), otherwise an outline page is identified with available space and the page is retrieve using the corresponding outline page address.

Figure 4:
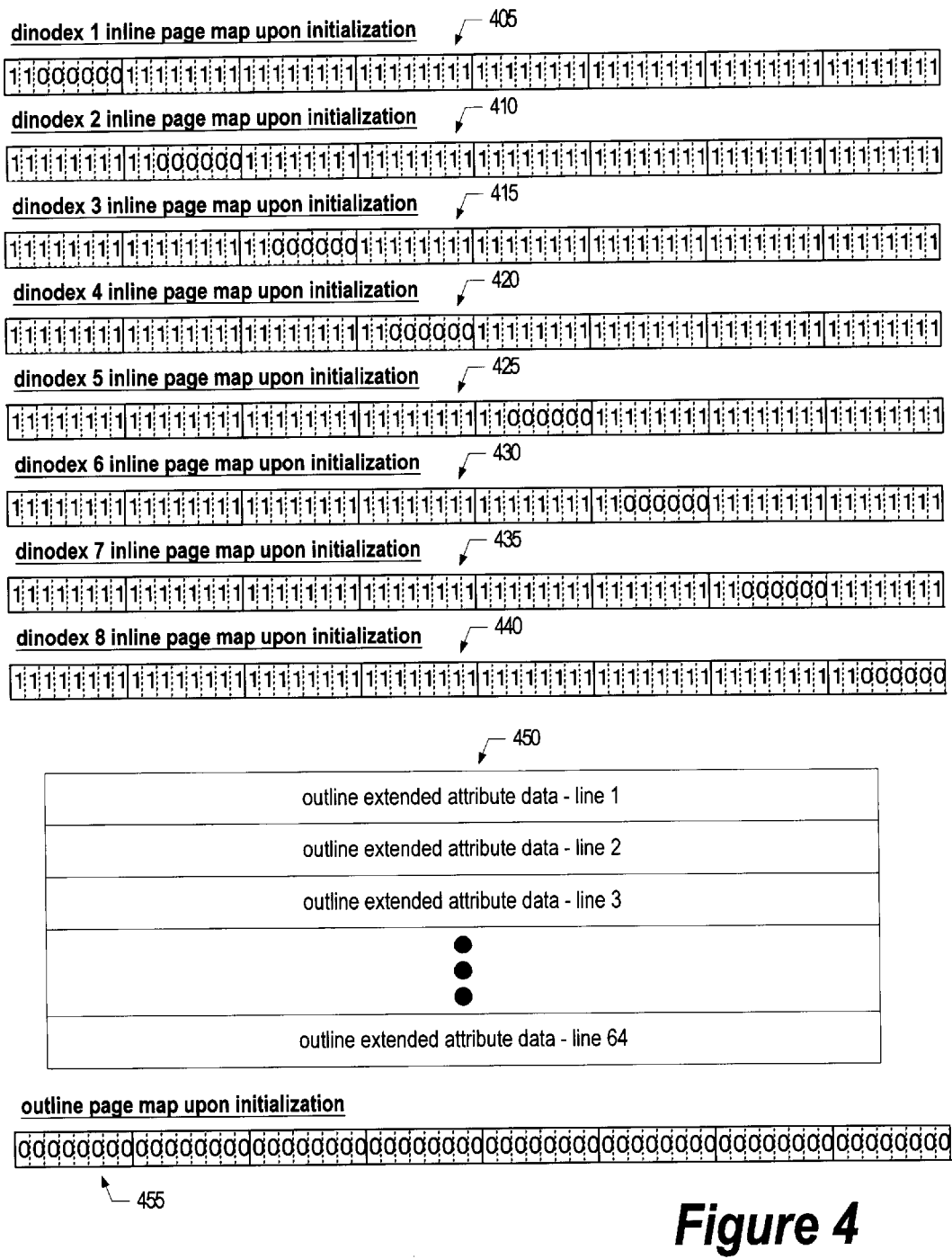
FIG. 4 is a set of inline page bitmaps upon initialization and a format for an outline extended attribute page.

FIG. 4 shows a set of inline page bitmaps upon initialization and a format for an outline extended attribute page along with its initial page map.

Dinodex 1 inline page map (405) is shown with the first eight bits representing the dinodex 1 data area. This bitmap would be stored in the inline eapage bitmap included with the dinodex data area (see FIG. 3, inline eapage bitmap 345). Of these eight bits, the first two are flagged ("1") indicating that the lines are in use because the first two lines are used to store the dinodex bitmaps (line 1) and the extended attribute directory (line 2). The next six bits are shown as available ("0") for storing extended attribute data. The remaining 56 bits are flagged indicating that the lines are in use because they are used by other dinodex data areas (areas 2 through 8).

Similarly, the bitmaps for the other dinodex data areas (bitmaps 410, 415, 420, 425, 430, 435, and 440) indicate which bits are available by their respective data areas. Notice how the available bits shift from one bitmap to the next, with available bits being the $3^{rd}$ through $8^{th}$ bits in bitmap 405, the $11^{th}$ through $16^{th}$ in bitmap 410, and so on until the available bits are the $59^{th}$ through the $64^{th}$ in bitmap 440.

Outline page 450 shows an outline page and outline bitmap 455 shows the bitmap corresponding to outline page 450 upon creation, or initialization, of the corresponding dinodex data area. Outline page 450 includes 64 lines for storing extended attribute data with each line being able to store 512 bits (64 bytes). Upon initialization, outline bitmap 455 is shown with every line in outline page 450 being available ("0"). Whenever a line of outline page 450 is used to store extended attribute data, the corresponding bit in bitmap 455 is flagged ("1") indicating that the line is already in use.

Figure 5:
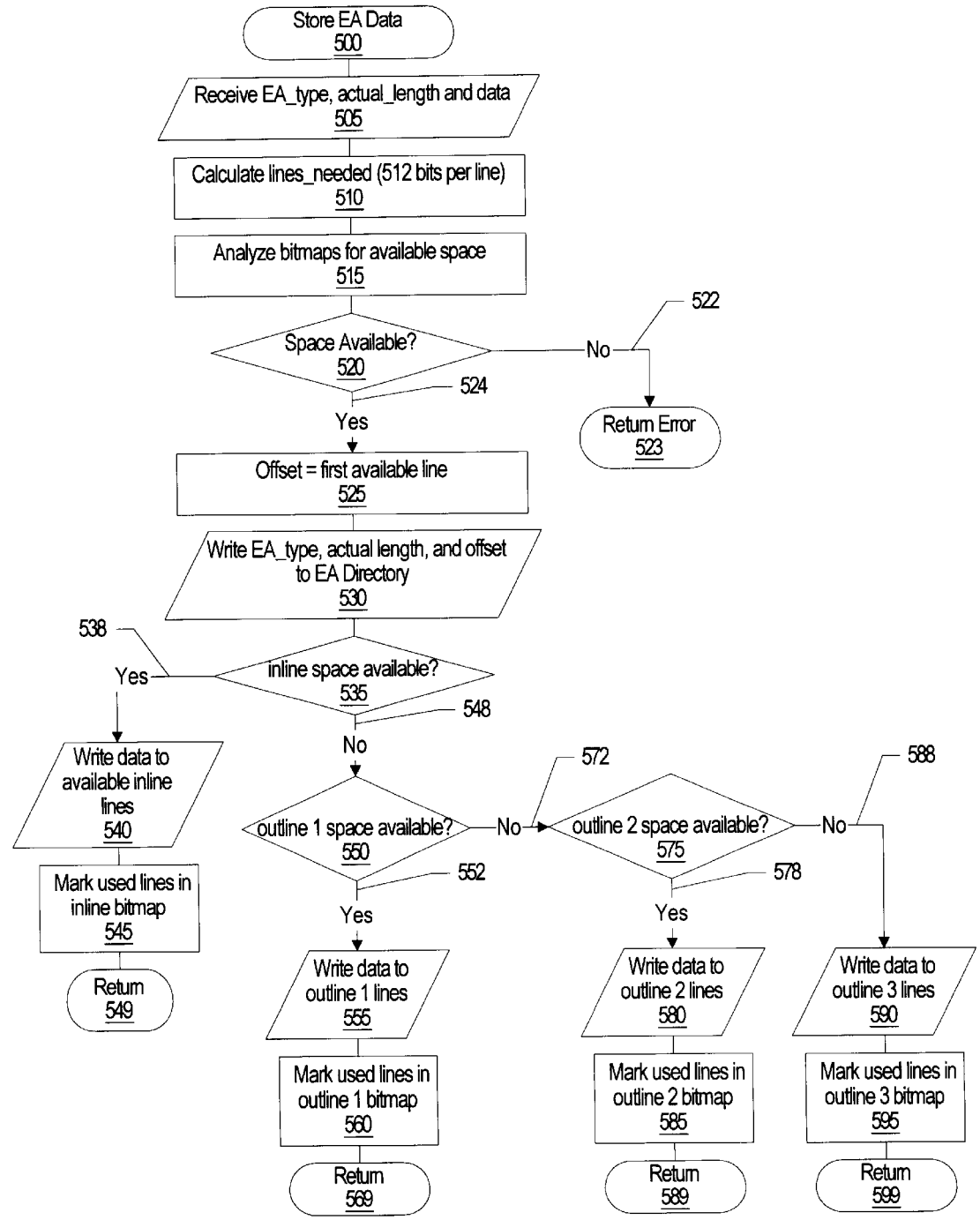
FIG. 5 is a flowchart showing the details involved in storing extended attribute data.

FIG. 5 shows a flowchart showing the details involved in storing extended attribute data. Processing commences at 500 whereupon an extended attribute storage request is received (input 505). The extended attribute storage request includes the extended attribute data that the application or user is requested be stored, along with a name associated with the extended attribute data (EA_type), and an actual length corresponding to the data. Alternatively, the actual length can be calculated by analyzing the received data. The number of 512 bit (64 byte) lines needed to store the data is calculated based on the actual length of the data (step 510). Each EA_type begins on a new line, so if the data does not fill the last line needed, the extra bytes on the last line are unused. The bitmaps stored in the dinodex data area (inline bitmap, outline 1 bitmap, outline 2 bitmap, and outline 3 bitmap) are analyzed to determine if sufficient space exists to store the data (step 515). A determination is made as to whether space exists to store the data (decision 520). If there is not enough space to store the data, decision 520 branches to "no" branch 522 whereupon an error is returned to the requesting process (return error 523) indicating that there is insufficient extended attribute space to satisfy the request.

On the other hand, if space is available, decision 520 branches to "yes" branch 524 whereupon an offset is determined by the number of the first available line that will be used to store the data. In one embodiment, the offset includes the page that is used to store the data (inline, outline 1, 2, or 3) is included along with the offset from the beginning of the chosen page. In another embodiment, the offset indicates the line position as if the inline dinodex page and the outline pages were in a contiguous area with the actual page determined by analyzing the offset number (the first 64 lines included in the dinodex page, the next 64 lines included in outline page 1, the next 64 lines included in outline page 2, and the last 64 lines included in outline page 3), so that an offset of "66" would indicate the second line in outline page 1.

The EA_type, actual length of the data, and offset are stored (output 530) in the EA directory (see FIG. 3, extended attribute directory 382 for details about the EA directory). Analyzing inline bitmap (see FIG. 3, inline eapage bitmap 345 for details about this bitmap) determines whether space is available in the inline data area (decision 535). If inline space is available, decision 535 branches to "yes" branch 538 whereupon the data is written to one or more lines (up to 6 lines total) in the inline data area (step 540). The corresponding bits in the inline bitmap are also flagged as being used (step 545) before processing returns at 549.

If inline space is not available, decision 535 branches to "no" branch 548. Analyzing outline 1 bitmap (see FIG. 3, outline 1 bitmap 350 for details about this bitmap) determines whether space is available in the outline page 1 (decision 550). If outline page 1 space is available, decision 550 branches to "yes" branch 552 whereupon the data is written to one or more outline page 1 lines (output 555). The corresponding bits in the outline 1 bitmap are flagged as being used (step 560) before processing returns at 569.

If outline page 1 space is not available, decision 550 branches to "no" branch 572. Analyzing outline 2 bitmap (see FIG. 3, outline 1 bitmap 355 for details about this bitmap) determines whether space is available in the outline page 2 data area (decision 575). If outline page 2 space is available, decision 575 branches to "yes" branch 578 whereupon the data is written to one or more outline page 2 lines (output 580). The corresponding bits in the outline 2 bitmap are flagged as being used (step 585) before processing returns at 589.

Finally, if outline page 2 space is not available, decision 575 branches to "no" branch 588 whereupon the data is written to one or more outline page 3 lines (output 590) and the corresponding bits in the outline 3 bitmap are flagged as being used (step 595) before processing returns at 599.

Figure 6:
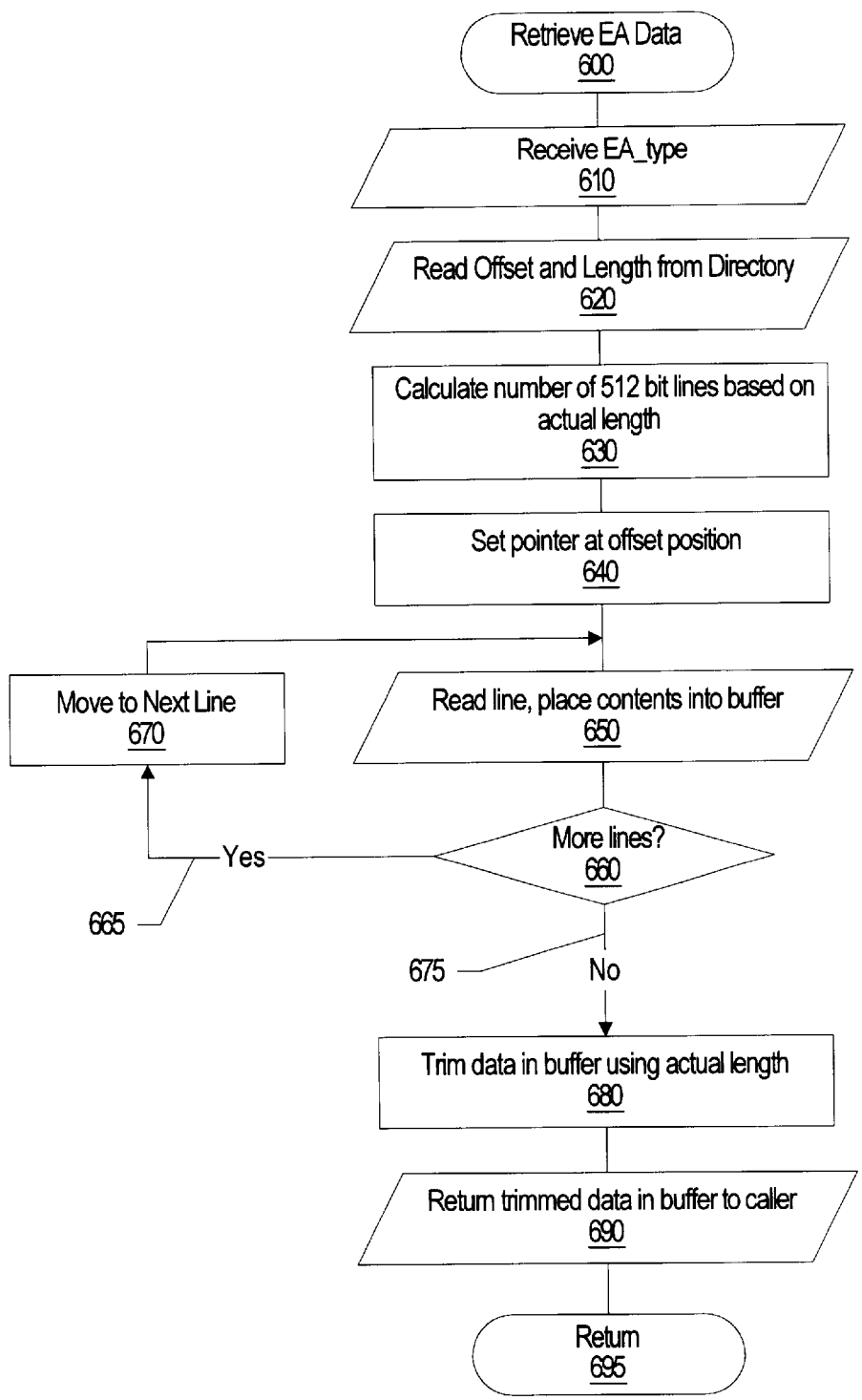
FIG. 6 is a flowchart showing the details involved in retrieving extended attribute data.

FIG. 6 shows a flowchart showing the details involved in retrieving extended attribute data. Processing commences at 600 whereupon a retrieval request is received for an extended attribute type stored in the extended data (input 610). The extended attribute type is used to find the offset and actual length from the extended attribute directory (input 620). The number of 512 bit lines that need to be read is calculated based on the actual length field retrieved from the extended attribute directory (step 630). A pointer is set at the offset position found in the extended attribute directory (step 640). In one embodiment, the offset is divided by 64 with the integer quotient providing the page upon which the data is stored and the remainder providing the line number within the page where the data begins. The contents of the line are read and placed into a buffer (input/output 650). A determination is made based on the calculated number of lines whether more lines need to be read (decision 660). If more lines need to be read, decision 660 branches to "yes" branch 665 and the pointer is moved to the next line (step 670) and processing loops back to read the next line and append its contents to the contents already in the buffer (input/output 650). This looping continues until all lines corresponding to the extended attribute type have been read and placed into the buffer at which point decision 660 determines that no more lines need to be read and branches to "no" branch 675. The data in the buffer was placed in the buffer in 512 bit chunks and this amount may be more than the actual amount of stored as extended attribute data. The buffer is therefore trimmed to remove any excess data at the end of the buffer (step 680). The trimmed buffer is returned to the caller (step 690) for processing by an application or other process using the extended attribute data. The retrieve extended attribute data processing ends at 695.

Figure 7:
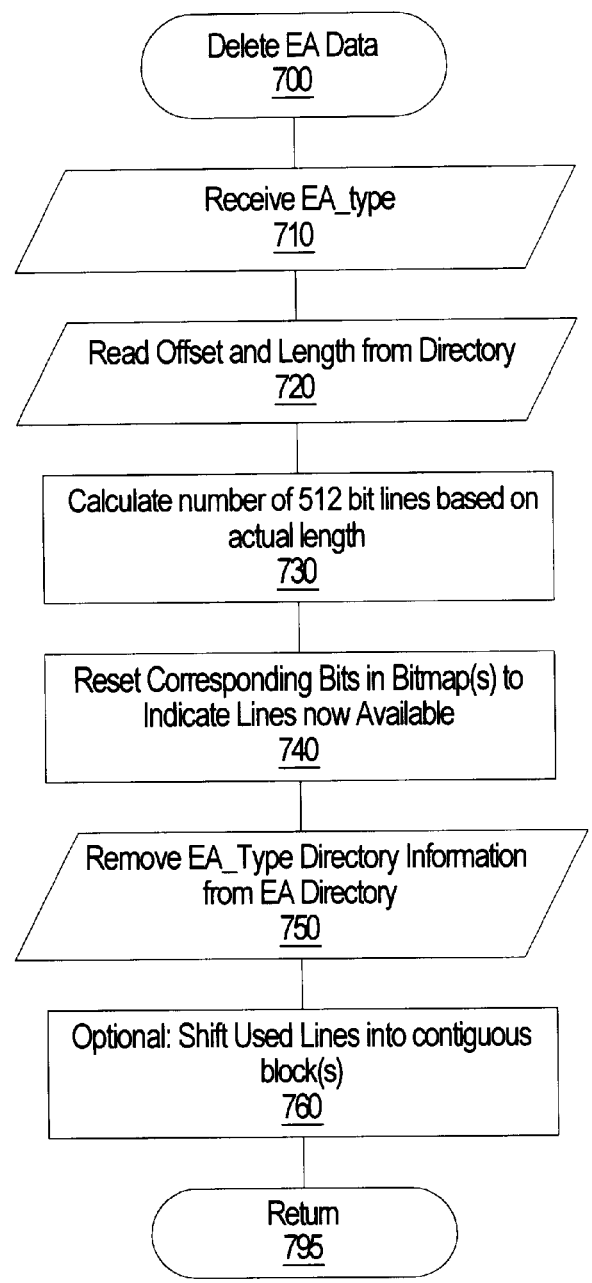
FIG. 7 is a flowchart showing the details involved in deleting extended attribute data.

FIG. 7 shows a flowchart showing the details involved in deleting extended attribute data. Processing commences at 700 whereupon a delete request is received for an extended attribute type stored as extended data (input 710). The extended attribute type is used to find the offset and actual length from the extended attribute directory (input 720). The number of 512 bit lines that need to be marked as available (i.e., deleted) is calculated based on the actual length field retrieved from the extended attribute directory (step 730). The bits in the bitmap corresponding to the extended attribute data are reset as available ("0") so that the space may be used to store other extended attribute data (step 740). Finally, the extended attribute type information is removed from the extended attribute directory to make room for other extended attribute type entries (output 750). In one embodiment, the bits in the bitmaps are marked as available and no additional processing is performed to defragment the lines within the pages used to store the extended attribute data. In another embodiment, used lines within a page are moved to defragment the page to make room for larger extended attribute types (optional step 760). Defragmenting the extended attribute pages could also be performed at a later time when demand for computer resources is lower. The delete extended attribute data processing ends at 695.

Figure 8:
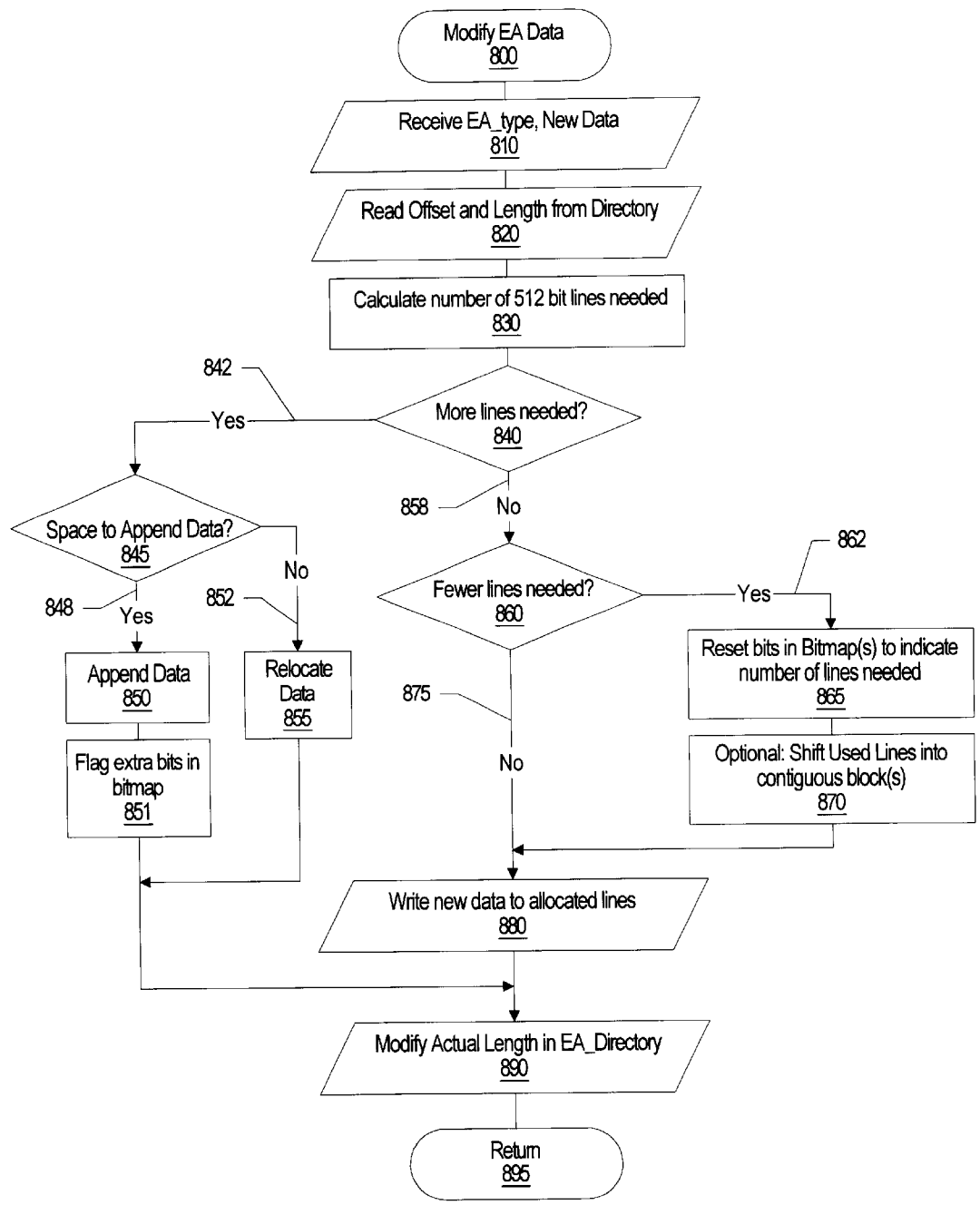
FIG. 8 is a flowchart showing the details involved in modifying extended attribute data.

FIG. 8 shows a flowchart showing the details involved in modifying extended attribute data. Processing commences at 800 whereupon a modification request is received for an extended attribute type stored in the extended data (input 810). The modification request includes the name of the extended attribute type being modified and the modified extended attribute data corresponding to the type. The extended attribute type is used to find the offset and actual length from the extended attribute directory (input 820). The number of 512 bit lines that currently exist for the extended attribute type is calculated based on the actual length field retrieved from the extended attribute directory (step 830). A determination is made by comparing the number of lines currently being used to store the extended attribute type data with the number of lines needed to store the new data received at input 810 (decision 840). If more lines are needed to store the data, decision 840 branches to "yes" branch 842. A second decision is made whether the current page used to store the data (inline, outline 1, 2 or 3) has enough empty lines after the currently stored data to append the additional data (decision 845). If enough empty lines follow the currently used lines, decision 845 branches to "yes" branch 848 whereupon additional lines within the page are used to store the data (step 850) and additional bits in the bitmap are flagged to indicate the additional lines being used (step 851). On the other hand, if there are not enough empty lines after the currently stored data to append the additional data, decision 845 branches to "no" branch 852 whereupon the data is relocated to another place (step 855) on either the current page or another page. Relocation involves deleting the currently allocated space (see FIG. 7) and adding the data to a another place on either the current page or another page (see FIG. 5).

Returning to decision 840, if more lines are not needed, decision 840 branches to "no" branch 858. Another decision is made to determine if fewer lines are needed (decision 860). If fewer lines are needed, decision 860 branches to "yes" branch 862 whereupon the corresponding end bits are reset to show that the lines are available (step 865). In one embodiment, the bits in the bitmaps are marked as available and no additional processing is performed to defragment the lines within the page used to store the extended attribute data. In another embodiment, used lines within a page are moved to defragment the page and make room for larger extended attribute types (optional step 870). If fewer lines are not needed, decision 860 branches to "no" branch 875. If more lines are not needed (decision 840 branched to "no" branch 858), the modified extended attribute data received at 810 is written to the allocated lines (output 880).

Finally, the actual length field in the extended attribute directory is modified to reflect the new size of the extended attribute data corresponding with the EA_type. Processing of the extended attribute data modification ends at 895.

Figure 9:
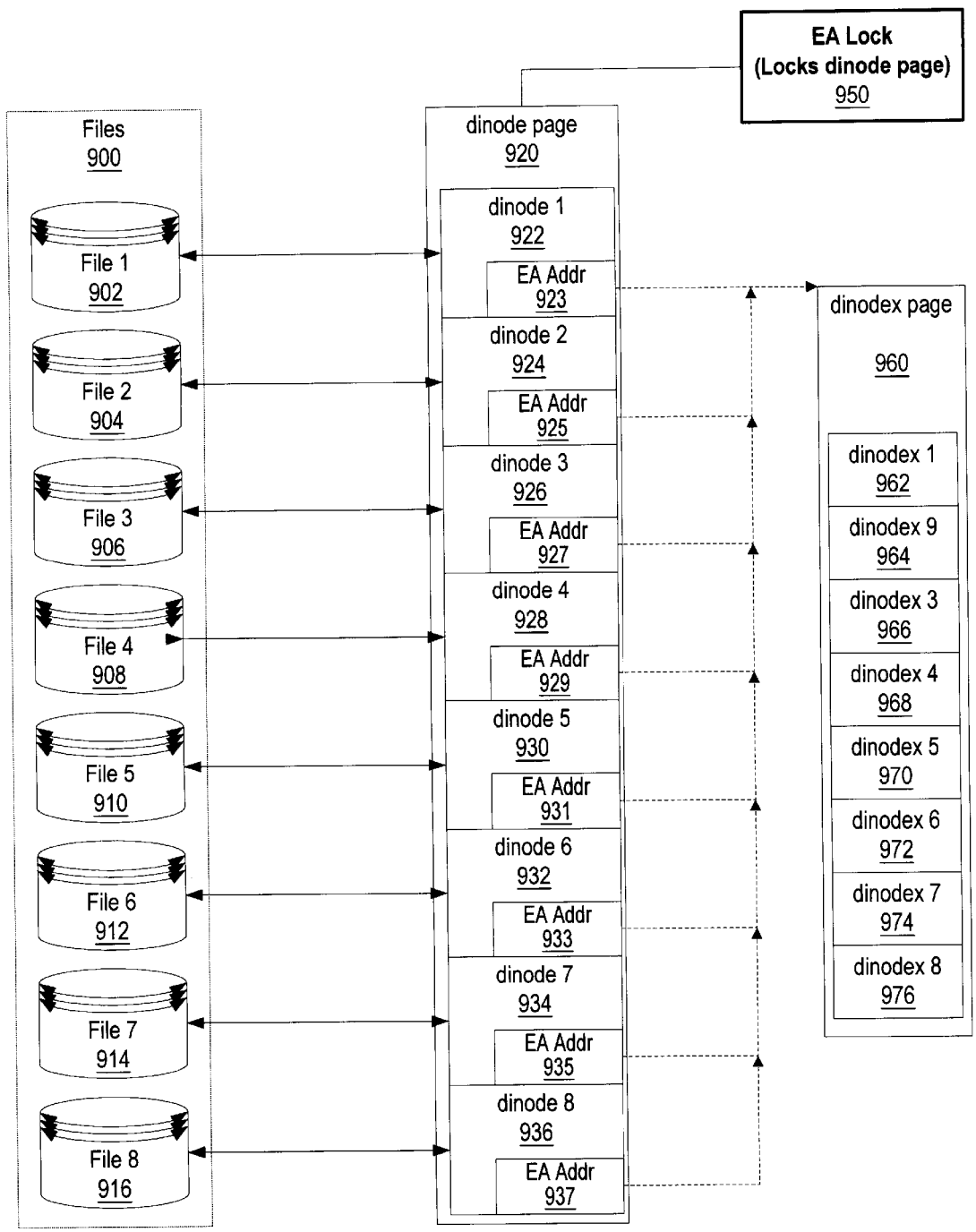
FIG. 9 is a diagram showing an EA Lock used to lock a dinode page that includes several dinodes and corresponds to a particular dinodex page.

FIG. 9 shows a diagram of an EA Lock used to lock a dinode page that includes several dinodes and corresponds to a particular dinode page. A file system maintains information concerning files 900 in dinode page 920. In one embodiment, each dinode page is arranged so that it can maintain information corresponding to up to eight files.

In the example shown, information about eight files is stored in dinode page 920. Each of the files has an area within dinode page 920 for system information about the particular file, such as the file's size, location, name, and other common system attributes. In addition, each dinode area includes an extended attribute address which optionally references dinodex page 960 that is used to store additional data about the file (metadata) that is used by applications, users, system administrators, etc. in handling the file. For example, a word processing document file may have extended attribute data indicating the author of the file, the company that created the file, etc. The information in this example would be maintained by the word processing application and stored in dinodex page 960 in the data area corresponding to the particular file.

Each of files 900 (file 902, file 904, file 906, file 908, file 910, file 912, file 914, and file 916) correspond to a dinode stored within dinode page 920 (file 902 corresponds with dinode 922, file 904 corresponds with dinode 924, file 906 corresponds with dinode 926, file 908 corresponds with dinode 928, file 910 corresponds with dinode 930, file 912 corresponds with dinode 932, file 914 corresponds with dinode 934, and file 916 corresponds with dinode 936). Each of the dinode areas include an extended attribute address that optionally refers the dinode to dinodex page 960 (dinode 922 includes with EA Address 923, dinode 924 includes with EA Address 925, dinode 926 includes with EA Address 927, dinode 928 includes with EA Address 929, dinode 930 includes with EA Address 931, dinode 932 includes with EA Address 933, dinode 934 includes with EA Address 935, and dinode 936 includes with EA Address 937). If a dinode has extended attribute data then the included EA Address is the address of dinodex page 960. On the other hand, if the dinode does not have extended attribute data then the included EA Address is zero (or some non-address value) to indicate that the dinode does not have extended attribute data.

Dinodex page 960 is configured so that each dinode is apportioned an amount of space for storing extended attribute data. An offset is used to determine which space within the dinodex page corresponds to a particular dinode. The first dinode in the dinode page (922) corresponds with the first extended attribute data area (962) in dinodex page 960. The second dinode in the dinode page (924) corresponds with the second extended attribute data area (964) in dinodex page 960, and so on (dinode 926 corresponds with extended attribute data area 966, dinode 928 corresponds with extended attribute data area 968, dinode 930 corresponds with extended attribute data area 970, dinode 932 corresponds with extended attribute data area 972, dinode 934 corresponds with extended attribute data area 974, and dinode 936 corresponds with extended attribute data area 976). If the EA Address is zero then the corresponding EA data area does not contain extended attribute data, whereas if the EA Address is not zero then the corresponding EA data area includes extended attribute data.

Extended Attribute Lock (EA Lock 950) controls the modification (addition or deletion) of a dinode's EA Address. This control promotes cooperation between dinodes that are often unrelated other than their inclusion in a common dinode page. Before a dinode within dinode page 920 adds an EA Address (i.e., the address was zero but now the dinode wishes to use extended attribute data) it obtains EA Lock 950. In addition, before a dinode within dinode page 920 deletes its EA data it also obtains EA Lock 950. Controlling the modification of the EA Address promotes cooperation between the dinodes so that (1) two dinodes do not try to add a new dinodex page at the same time, (2) two dinodes do not try to delete the dinodex page at the same time, (3) one dinode does not try to delete the dinodex page at the same time another dinode is trying to allocate the dinodex page, as well as other concurrency situations.

Figure 10:
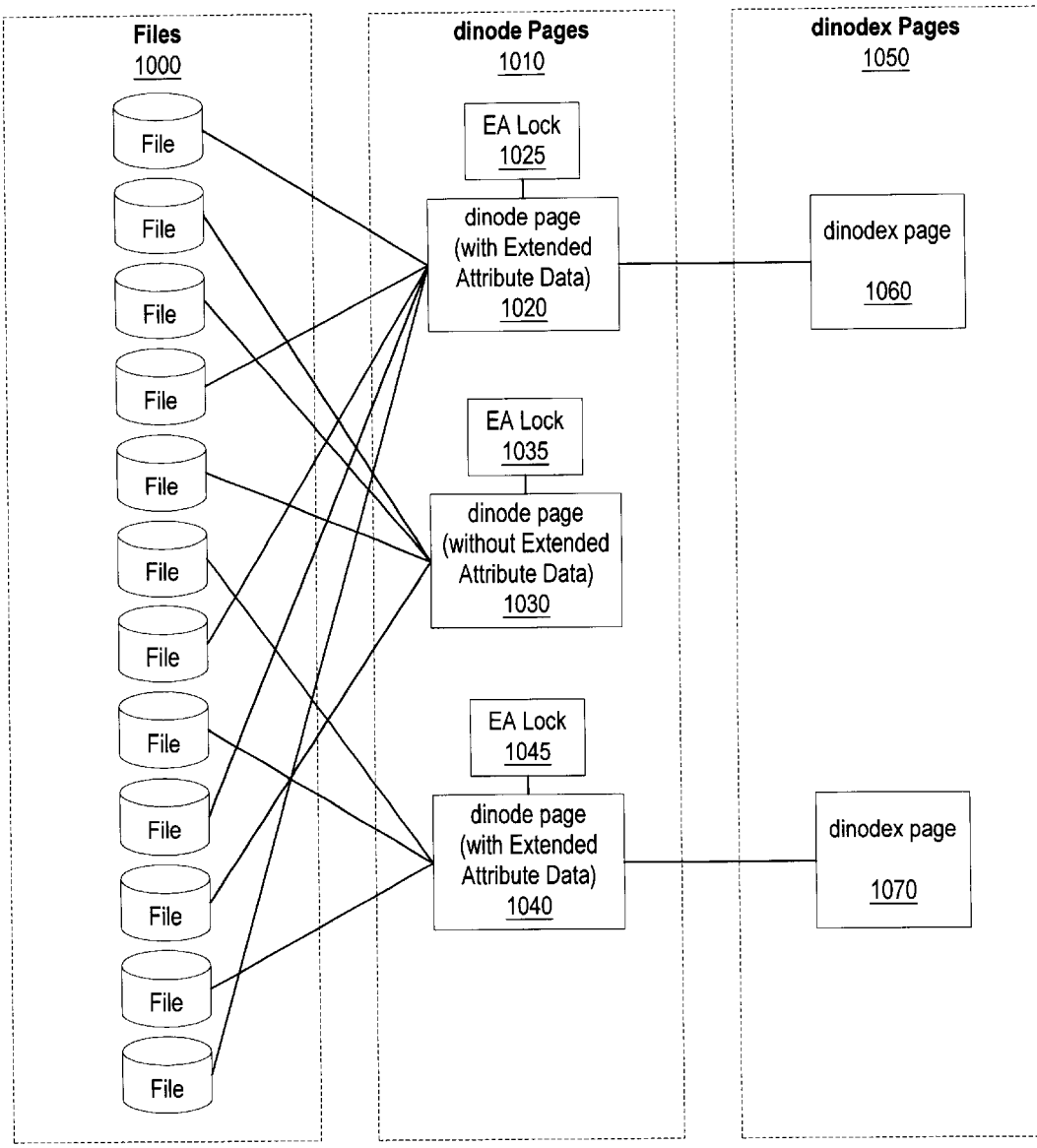
FIG. 10 is a diagram showing how unrelated files are managed by various dinode pages and how each dinode page may correspond to an optional dinodex page depending upon the needs of the files stored in the particular dinode page.

FIG. 10 shows a diagram indicating how unrelated files are managed by various dinode pages and how each dinode page may correspond to an optional dinodex page depending upon the needs of the files stored in the particular dinode page. In the example shown in FIG. 10, files 1000 include multiple files maintained by the file system. Some of these files may be similar to one another (i.e., multiple word processing files) and may be dissimilar (i.e., completely different types of files used by different applications). Regardless of their similarities or differences, files 1000 are maintained by the file system in dinode pages 1010.

Dinode pages 1010 are used to maintain file system data about files 1000. In the example shown, dinode page 1020 is used to maintain information about five files while dinode page 1030 maintains data about four files and dinode page 1040 maintains data about three files. Dinodex pages 1050 are used to store extended attribute data about one or more files within a dinode page. In the example shown, a dinodes page corresponds with dinode page 1020 and 1040 (dinodex page 1060 and 1070, respectively) but no dinodex page corresponds to dinode page 1030. No dinodex page corresponds to dinode page 1030 because none of the files maintained by dinode page 1030 has extended attribute data. Because files maintained by dinode pages are not necessarily related, an EA Lock is used for each dinode page (EA Lock 1025 corresponds to dinode page 1020, EA Lock 1035 corresponds to dinode page 1030, and EA Lock 1045 corresponds to dinode page 1040). When any of the dinodes maintained by a dinode page request to remove or add extended attribute data they must first obtain the respective EA Lock (i.e., dinodes maintained in dinode page 1020 obtain EA Lock 1025, dinodes maintained in dinode page 1030 obtain EA Lock 1035, etc.).

The EA Lock for each page is rather granular in that it only is used for changing the value of one field (the EA Address) included with each dinode maintained by the page. In addition, a limited number of dinodes is maintained by a particular dinode page. In one embodiment, the maximum number of dinodes maintained by a dinode page is eight. The granularity coupled with the limited number of dinodes that may request a particular EA lock allows cooperation without unduly impacting performance.

Figure 11:
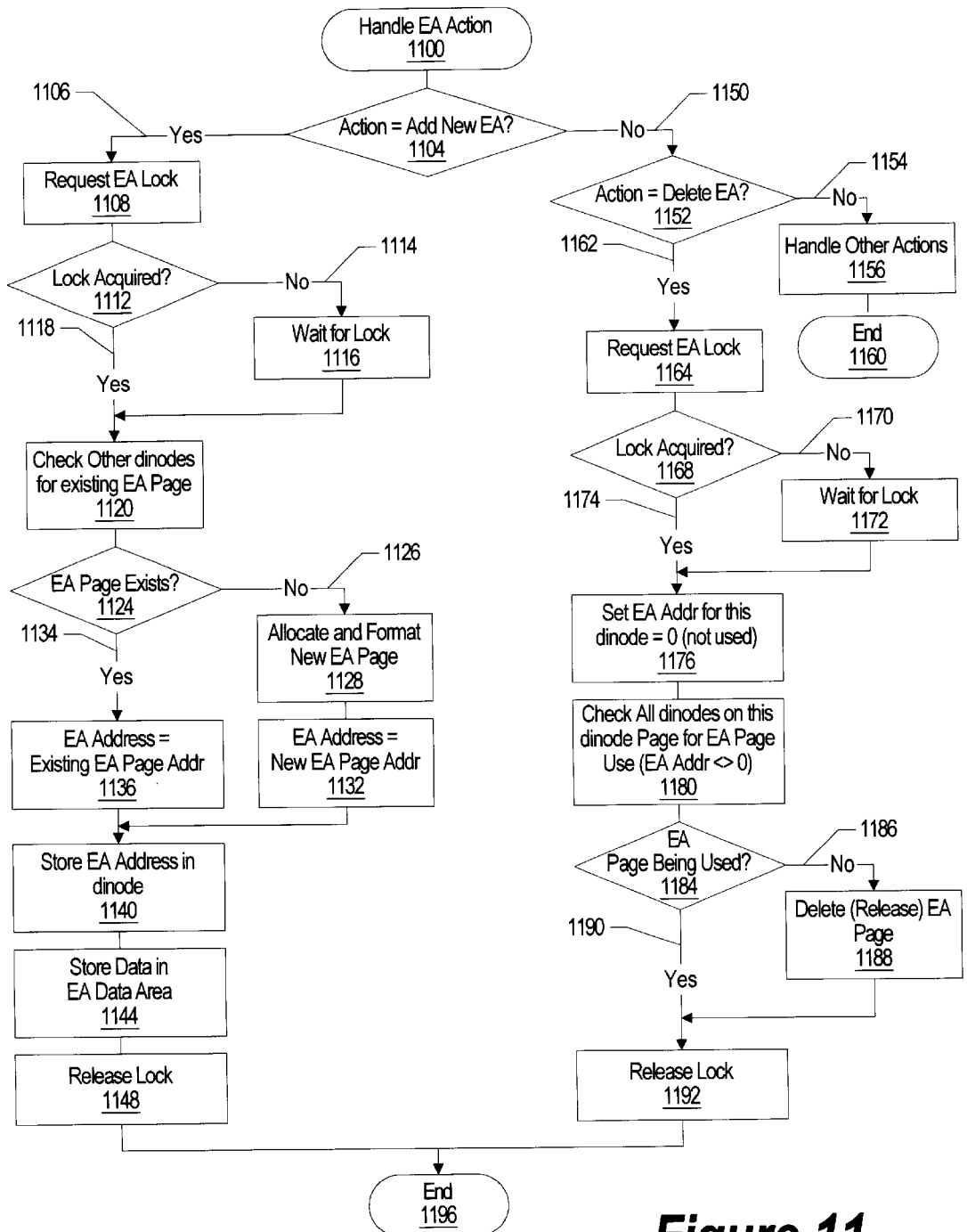
FIG. 11 is a flowchart showing how the extended attribute lock is applied to a dinode page in order to provide cooperation when performing certain extended attribute data tasks.

FIG. 11 shows a flowchart of implementing the extended attribute lock and applying it to a dinode page in order to provide cooperation when performing certain extended attribute data tasks. File system processing handles a variety of tasks for maintaining dinode information. Processing of file system processing that handles extended attribute actions commences at 1100. A determination is made as to whether the extended attribute action is to add new extended attribute data for a dinode that currently does not use extended attribute data (decision 1104).

If the extended attribute action is to add a new extended attribute address to a dinode, decision 1104 branches to "yes" branch 1106 whereupon the EA Lock for the dinode page that maintains the dinode is requested (step 1108). A determination is made as to whether the EA Lock is acquired or if the lock is currently being held by another process or thread (decision 1112). If the lock is currently being held by another process or thread, decision 1112 branches to "no" branch 1114 whereupon the process is added to a queue corresponding to the lock and waits for the lock to become available (step 1116). On the other hand, if the lock is acquired immediately (i.e., no other process was holding the lock), "yes" branch 1118 is taken bypassing the wait for lock step.

When the process has acquired the lock, it checks EA Addresses included with other dinodes in the same dinode page as the dinode that is adding an EA Address (step 1120). A determination is made as to whether an EA page already exists corresponding to the dinode page (decision 1124). If an EA page does not yet exist, decision 1124 branches to "no" branch 1126 whereupon a new EA page is allocated and formatted to maintain EA data for any dinode within the dinode page that uses EA data (step 1128). The EA address field of the dinode is changed from zero to the address of the newly allocated EA page (step 1132).

On the other hand, if checking the other dinodes revealed that an EA page already existed for the dinode page, decision 1124 branches to "yes" branch 1134 whereupon the extended attribute field of the dinode is changed from zero to the address of the EA page that already exists and corresponds to the dinode page (step 1136).

The EA Address is stored in the dinode (step 1140) and extended attribute data that corresponds to the dinode is stored in the extended data area corresponding to the dinode (step 1144). The EA Lock is released (step 1148) so that other dinodes can use the lock and processing of the added EA Address ends at 1196.

Returning to decision 1104, if the extended attribute action is not to add a new extended attribute to the dinode, decision 1104 branches to "no" branch 1150. A determination is made as to whether the extended attribute action is to delete the extended attribute data (i.e., reset the dinode's EA address to zero) corresponding to the dinode (decision 1152). If the action is not to delete the extended attribute data corresponding to the dinode, decision 1152 branches to "no" branch 1154 whereupon other extended attribute actions are handled (step 1156) and processing ends at 1160. On the other hand, if the action is to delete the extended attribute data corresponding to the dinode, decision 1152 branches to "yes" branch 1162 whereupon the EA Lock for the dinode page that maintains the dinode is requested (step 1164). A determination is made as to whether the EA Lock is acquired or if the lock is currently being held by another process or thread (decision 1168). If the lock is currently being held by another process or thread, decision 1168 branches to "no" branch 1170 whereupon the process is added to a queue corresponding to the lock and waits for the lock to become available (step 1172). On the other hand, if the lock is acquired immediately (i.e., no other process was holding the lock), "yes" branch 1174 is taken bypassing the wait for lock step.

The EA address included with the dinode is set to zero indicating that the dinode is no longer using the extended attribute data area (step 1176). All dinodes being maintained by this dinode page are checked to see if any of the dinodes are using extended attribute data (step 1180). This check can be performed by checking the EA Address corresponding to each dinode and determining whether the address is zero (indicating that EA data not used) or nonzero (indicating that EA data is being used). A determination is made (decision 1184) as to whether at least one dinode's EA address is not zero (i.e., the EA page is being used by at least one other dinode). If the EA page is not being used, decision 1184 branches to "no" branch 1186 whereupon the EA page is deleted (released) making the storage available to other file system objects (step 1188). On the other hand, if at least one dinode is using the EA page, decision 1184 branches to "yes" branch 1190 bypassing the deletion of the EA page. The EA Lock is released (step 1192) so that other dinodes can use the lock and processing of the added EA Address ends at 1196.

Figure 12:
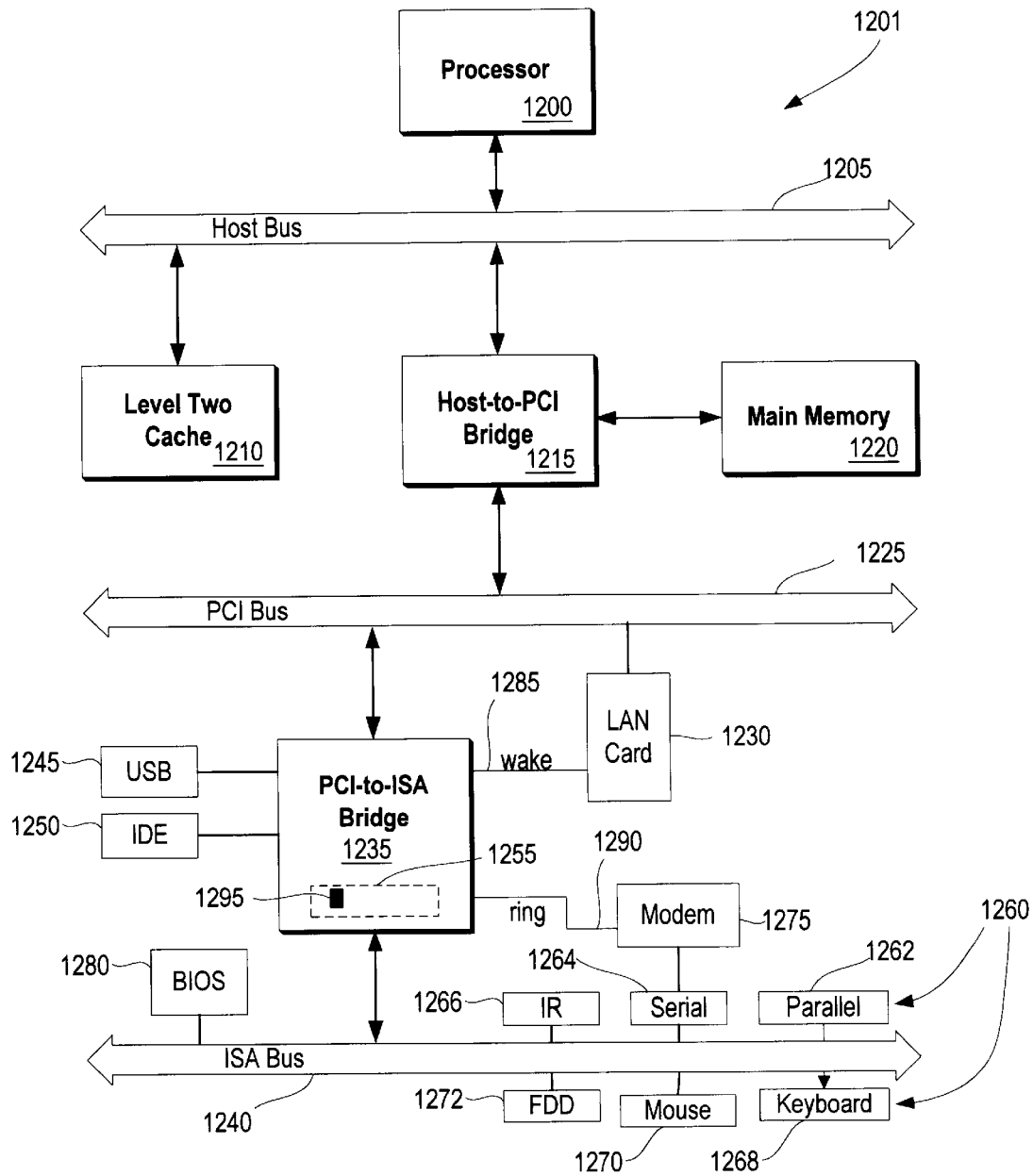
FIG. 12 is a block diagram of an information handling system capable of performing the present invention.

FIG. 12 illustrates information handling system 1201 which is a simplified example of a computer system capable of performing the copy processing described herein. Computer system 1201 includes processor 1200 which is coupled to host bus 1205. A level two (L2) cache memory 1210 is also coupled to the host bus 1205. Host-to-PCI bridge 1215 is coupled to main memory 1220, includes cache memory and main memory control functions, and provides bus control to handle transfers among PCI bus 1225, processor 1200, L2 cache 1210, main memory 1220, and host bus 1205. PCI bus 1225 provides an interface for a variety of devices including, for example, LAN card 1230. PCI-to-ISA bridge 1235 provides bus control to handle transfers between PCI bus 1225 and ISA bus 1240, universal serial bus (USB) functionality 1245, IDE device functionality 1250, power management functionality 1255, and can include other functional elements not shown, such as a real-time clock (RTC), DMA control, interrupt support, and system management bus support. Peripheral devices and input/output (I/O) devices can be attached to various interfaces 1260 (e.g., parallel interface 1262, serial interface 1264, infrared (IR) interface 1266, keyboard interface 1268, mouse interface 1270, and fixed disk (FDD) 1272) coupled to ISA bus 1240. Alternatively, many I/O devices can be accommodated by a super I/O controller (not shown) attached to ISA bus 1240.

BIOS 1280 is coupled to ISA bus 1240, and incorporates the necessary executable code for a variety of low-level system functions and system boot functions. BIOS 1280 can be stored in any computer readable medium, including magnetic storage media, optical storage media, flash memory, random access memory, read only memory, and communications media conveying signals encoding the instructions (e.g., signals from a network). In order to attach computer system 1201 another computer system to copy files over a network, LAN card 1230 is coupled to PCI-to-ISA bridge 1235. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for controlling extended attribute data changes, said method comprising:
   determining an action involving an extended attribute address included in a file system area;
   obtaining an extended attribute lock in response to the determination;
   performing the action;
   releasing the extended attribute lock;
   providing one or more dinode pages for maintaining file system data, wherein each dinode page includes one or more dinodes; and
   identifying one or more extended attribute locks corresponding to the dinode pages.

2. The method of claim 1 wherein each of the dinodes includes an extended attribute address field, the method further comprising:
   allocating a new extended attribute page in response to determining that the dinode page does not correspond to an existing extended attribute page; and
   adding an extended attribute address to the extended attribute address field.

3. The method of claim 2 further comprising:
   formatting the allocated new extended attribute page into one or more data sections, wherein each of the data sections is adapted to store data corresponding to one of the dinodes maintained by the dinode page.

4. The method of claim 1 wherein each of the dinodes includes an extended attribute address field, the method further comprising:
   copying an existing extended attribute page address corresponding to an existing extended attribute page to the extended attribute address field in response to determining that the dinode page corresponds to the existing extended attribute page.

5. The method of claim 1 wherein each of the dinodes includes an extended attribute address field, the method further comprising:

setting the extended attribute address field to a non-address value; and deleting an existing extended attribute page in response to determining that none of the dinodes use the existing extended attribute page.

6. The method of claim 1 wherein each of the dinodes includes an extended attribute address field, the method further comprising:

setting the extended attribute address field to a non-address value; and retaining an existing extended attribute page in response to determining that at least one of the dinodes maintained by the dinode page uses the existing extended attribute page.

7. An information handling system comprising:

one or more processors;

a memory accessible by the processors;

one or more nonvolatile storage devices accessible by the processors; and an extended attribute management tool for controlling extended attribute data changes, the extended attribute management tool including:

means for determining an action involving an extended attribute address included in a file system area;

means for obtaining an extended attribute lock in response to the determination;

means for performing the action;

means for releasing the extended attribute lock means for providing one or more dinode pages for maintaining file system data, wherein each dinode page includes one or more dinodes; and means for identifying one or more extended attribute locks corresponding to the dinode pages.

8. The information handling system of claim 7 wherein each of the dinodes includes an extended attribute address field, the information handling system further comprising;

means for allocating a new extended attribute page in response to determining that the dinode page does not correspond to an existing extended attribute page; and means for adding an extended attribute address to the extended attribute address field.

9. The information handling system of claim 7 wherein each of the dinodes includes an extended attribute address field, the information handling system further comprising:

means for copying an existing extended attribute page address corresponding to an existing extended attribute page to the extended attribute address field in response to determining that the dinode page corresponds to the existing extended attribute page.

10. The information handling system of claim 7 wherein each of the dinodes includes an extended attribute address field, the information handling system further comprising:

means for setting the extended attribute address field to a non-address value; and means for deleting an existing extended attribute page in response to determining that none of the dinodes use the existing extended attribute page.

11. The information handling system of claim 7 wherein each of the dinodes includes an extended attribute address field, the information handling system further comprising:

means for setting the extended attribute address field to a non-address value; and means for retaining an existing extended attribute page in response to determining that at least one of the dinodes maintained by the dinode page uses the existing extended attribute page.

12. A computer program product stored in a computer operable medium for controlling extended attribute data changes, the computer program product further comprising:

means for determining an action involving an extended attribute address included in a file system area;

means for obtaining an extended attribute lock in response to the determination;

means for performing the action;

means for releasing the extended attribute lock;

means for providing one or more dinode pages for maintaining file system data, wherein each dinode page includes one or more dinodes; and means for identifying one or more extended attribute locks corresponding to the dinode pages.

13. The computer program product of claim 12 wherein each of the dinodes includes an extended attribute address field, the computer program product further comprising:

means for allocating a new extended attribute page in response to determining that the dinode page does not correspond to an existing extended attribute page; and means for adding an extended attribute address to the extended attribute address field.

14. The computer program product of claim 13 further comprising:

means for formatting the allocated new extended attribute page into one or more data sections, wherein each of the data sections is adapted to store data corresponding to one of the dinodes maintained by the dinode page.

15. The computer program product of claim wherein each of the dinodes includes an extended attribute address field, the computer program product further comprising:

means for copying an existing extended attribute page address corresponding to an existing extended attribute page to the extended attribute address field in response to determining that the dinode page corresponds to the existing extended attribute page.

16. The computer program product of claim 12 wherein each of the dinodes includes an extended attribute address field, the computer program product further comprising:

means for setting the extended attribute address field to a non-address value; and means for deleting an existing extended attribute page in response to determining that none of the dinodes use the existing extended attribute page.

17. The computer program product of claim 12 wherein each of the dinodes includes an extended attribute address field, the computer program product further comprising:

means for setting the extended attribute address field to a non-address value; and means for retaining an existing extended attribute page in response to determining that at least one of the dinodes maintained by the dinode page uses the existing extended attribute page.

* * * * *

UNITED STATES PATENT AND TRADEMARK OFFICE
CERTIFICATE OF CORRECTION

PATENT NO. : 6,768,993 B2
DATED : July 27, 2004
INVENTOR(S) : Chang et al.

It is certified that error appears in the above-identified patent and that said Letters Patent is hereby corrected as shown below:

Column 16,
Line 39, please delete "claim wherein" and insert -- claim 12 wherein --.

Signed and Sealed this

Fourth Day of January, 2005

JON W. DUDAS
*Director of the United States Patent and Trademark Office*